United States Patent
Duffy et al.

(10) Patent No.: US 9,718,543 B2
(45) Date of Patent: Aug. 1, 2017

(54) GUIDED LIFT SYSTEM

(71) Applicant: The Boeing Company, Chicago, IL (US)

(72) Inventors: Michael J. Duffy, Prospect Park, PA (US); Leonard J. Quadracci, Seattle, WA (US); Anthony C. Samaritano, Toms River, NJ (US)

(73) Assignee: The Boeing Company, Chicago, IL (US)

( * ) Notice: Subject to any disclaimer, the term of this patent is extended or adjusted under 35 U.S.C. 154(b) by 67 days.

(21) Appl. No.: 14/506,054

(22) Filed: Oct. 3, 2014

(65) Prior Publication Data
US 2016/0096623 A1    Apr. 7, 2016

(51) Int. Cl.
    *B64C 39/02*    (2006.01)
    *B64D 1/22*    (2006.01)
    *B66F 19/00*    (2006.01)

(52) U.S. Cl.
    CPC .......... *B64C 39/022* (2013.01); *B64C 39/024* (2013.01); *B64D 1/22* (2013.01); *B66F 19/00* (2013.01); *B64C 2201/128* (2013.01)

(58) Field of Classification Search
    CPC .................................... B64D 9/00; B64F 1/32
    See application file for complete search history.

(56) References Cited

U.S. PATENT DOCUMENTS

| | | | | |
|---|---|---|---|---|
| 3,270,895 A * | 9/1966 | Stewart | ..................... | B64B 1/00 212/71 |
| 3,807,577 A * | 4/1974 | Bell | ........................ | B66C 21/00 104/173.1 |
| 3,865,251 A * | 2/1975 | Langford | ................ | B66C 21/00 212/71 |
| 4,055,316 A * | 10/1977 | Chipper | .................... | B64B 1/50 104/123 |
| 5,080,302 A * | 1/1992 | Hoke | ........................ | B64B 1/50 212/71 |
| 6,091,161 A * | 7/2000 | Dehlsen | ................... | B63G 8/18 290/43 |
| 7,183,663 B2 * | 2/2007 | Roberts | ................... | F03D 11/04 290/44 |
| 7,287,724 B2 * | 10/2007 | Hase | ........................ | B64B 1/50 244/30 |
| 8,205,835 B2 * | 6/2012 | Wiley | ..................... | B63B 35/44 244/1 R |

(Continued)

OTHER PUBLICATIONS

Sky Sapience Introduces Hover Mast—a Lightweight Autonomous Hovering Platform; pp. 1-13; Feb. 22, 2012;http://defense-update.com/20120222_ski-sapience-introduces-hovermast-a-lightweight-autonomous-hovering-tethered-platform.html.

(Continued)

*Primary Examiner* — Justin Benedik
(74) *Attorney, Agent, or Firm* — Miller, Matthias & Hull LLP

(57) ABSTRACT

Systems and methods provide for a guided lift system utilized for maneuvering payloads. According to aspects of the disclosure, a guided lift system may include a lift unit attached to a payload, at least two control tethers attached to the lift unit, and at least two control units fixed in positions and capable of adjusting the lengths of the control tethers. Coordinated length adjustments of the control tethers pulls the lift unit and payload in a desired direction to a desired delivery location.

20 Claims, 12 Drawing Sheets

(56) References Cited

U.S. PATENT DOCUMENTS

| | | | | |
|---|---|---|---|---|
| 8,602,349 | B2* | 12/2013 | Petrov | B64C 39/022 |
| | | | | 244/17.23 |
| 8,907,516 | B2* | 12/2014 | Carroll | B64C 39/022 |
| | | | | 290/44 |
| 9,043,052 | B2* | 5/2015 | So | G01C 23/00 |
| | | | | 701/3 |
| 9,045,218 | B2* | 6/2015 | Childress | B60L 9/00 |
| 9,174,733 | B1* | 11/2015 | Burgess | B64D 1/12 |
| 2011/0180667 | A1* | 7/2011 | O'Brien | B64C 39/022 |
| | | | | 244/135 R |
| 2013/0233964 | A1* | 9/2013 | Woodworth | B64C 37/02 |
| | | | | 244/2 |

OTHER PUBLICATIONS

Robots that are revolutionary in their Simplicity; CPYPHY Works; pp. 1-3; accessed today Oct. 3, 2014; http://cyphyworks.com.

* cited by examiner

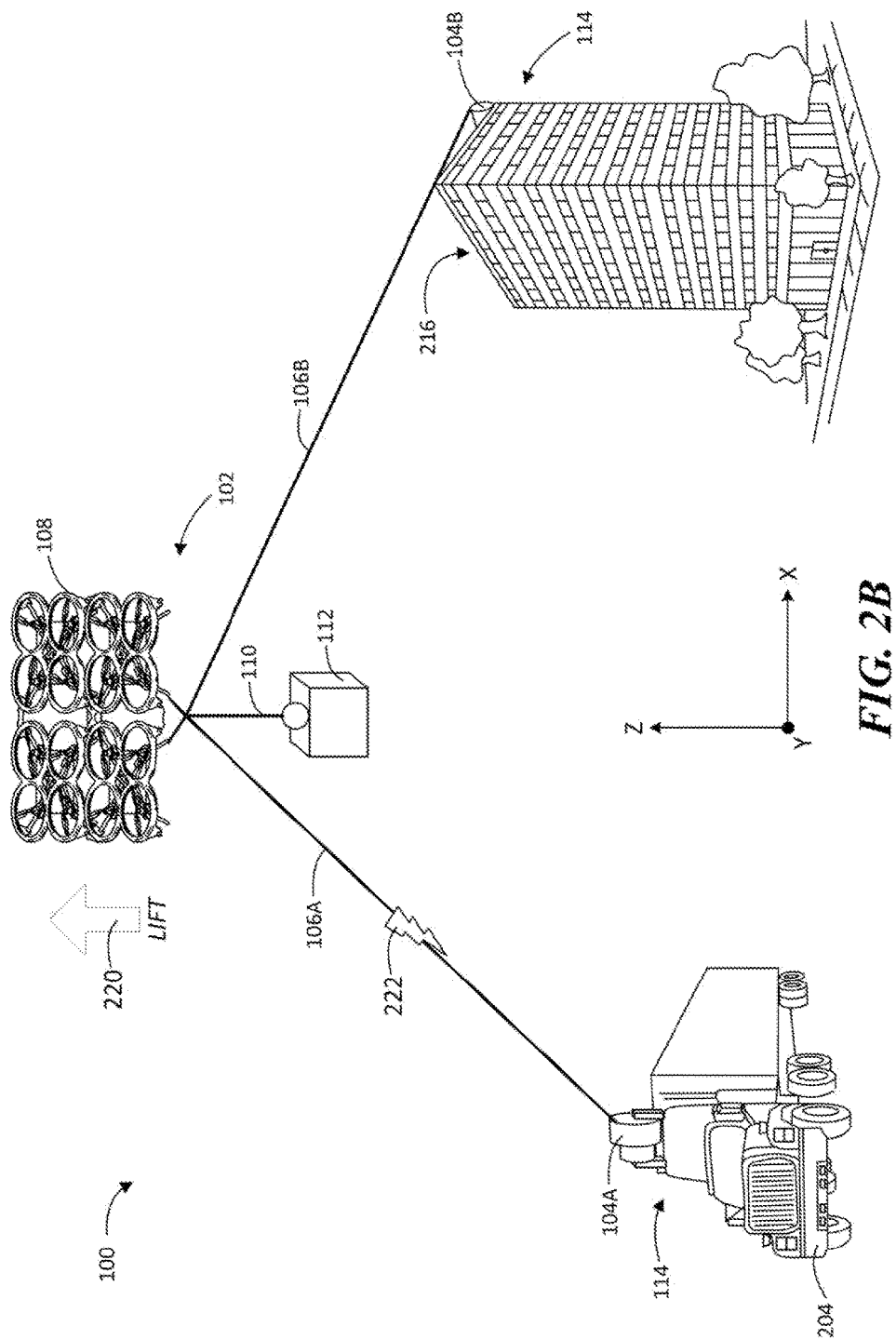

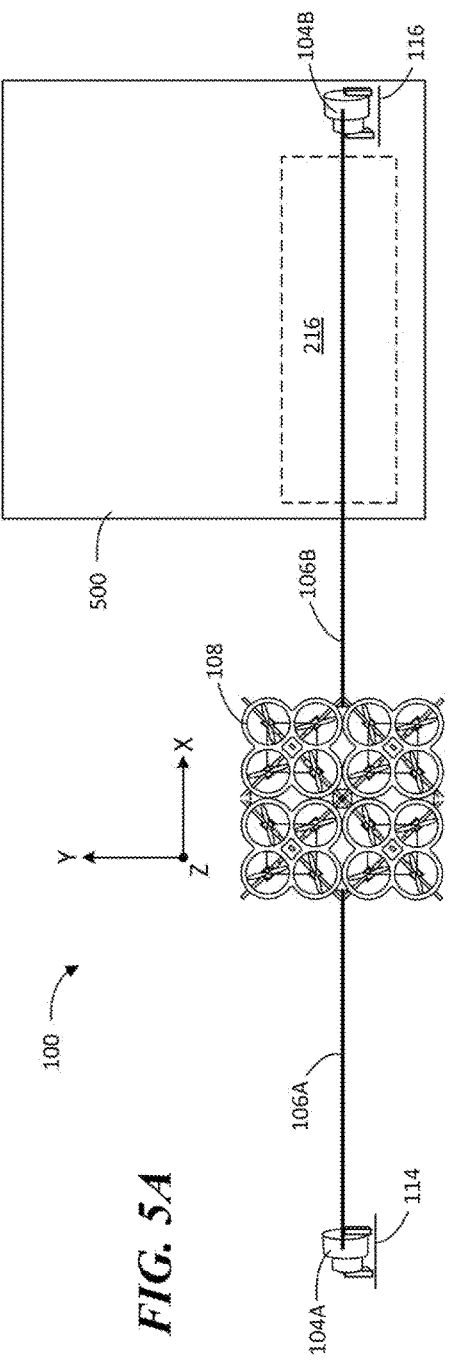
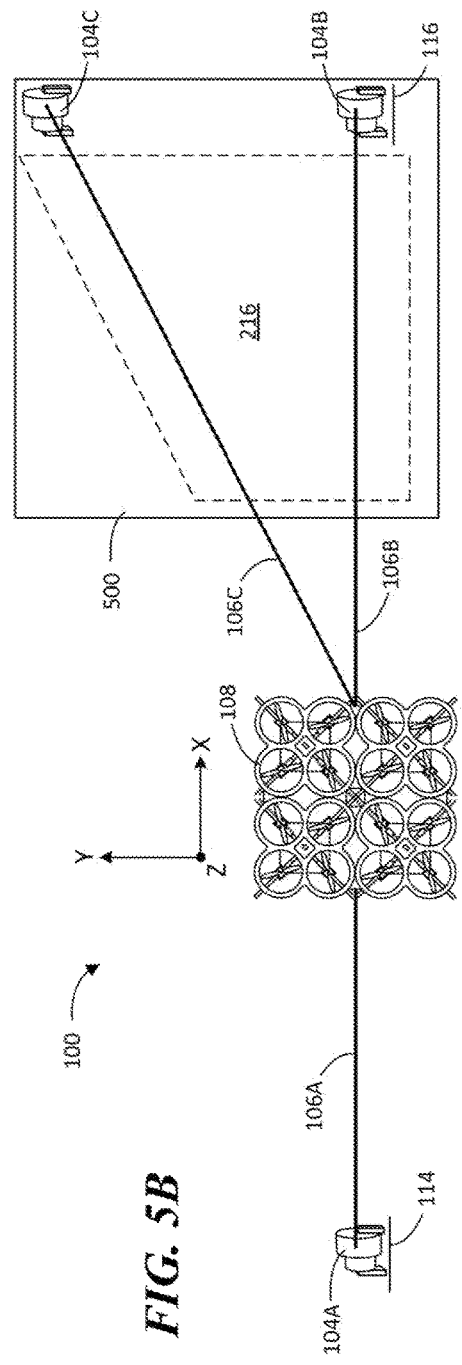
FIG. 5A
FIG. 5B

GUIDED LIFT SYSTEM

BACKGROUND

Unmanned aerial vehicles may be used for lifting and transporting payloads from one location to another. These remotely piloted lift vehicles require an operator to skillfully control the lift vehicle to precisely maneuver and place the payload, often in areas with limited operating space for the lift vehicle, or with limited visibility for the operator. Additionally, remotely piloted lift vehicles often require a large or complex sensor suite that is utilized to determine, monitor, and correct altitude, attitude, airspeed, and any other type of necessary or desired parameters associated with the vehicle, the environment, or the payload. These sensors increase the cost, reliability, and weight of the vehicles.

It is with respect to these considerations and others that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

Systems and methods described herein provide for a guided lift system for maneuvering a payload. According to one aspect, a guided lift system may include a lift unit attached to the payload and two control tethers attached to the lift unit. Two control units are attached to the control tethers and are operative to adjust the lengths of the control tethers to control movement of the lift unit and payload between the positions of the control units.

According to another aspect, a guided lift system may include a lift unit, including a lift vehicle and payload tether attached to the payload. The guided lift system may also include two control tethers attached to the lift unit. Two motorized winch assemblies are attached to the control tethers and are operative to adjust the lengths of the control tethers to control movement of the lift unit and payload between the positions of the motorized winch assemblies. A controller is coupled to motorized winch assemblies and is operative to coordinate length adjustments of the control tethers to move the lift unit and payload.

According to yet another aspect, a method for maneuvering a payload may include lifting a payload attached to a lift unit comprising a lift vehicle and a payload tether. At a first control unit at a first position, a first control tether attached to the lift unit is lengthened. At a second control unit at a second position, a second control tether attached to the lift unit is shortened at a rate corresponding to the lengthening of the first control tether to pull the lift unit between the first and second positions.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

FIG. 2B is a perspective view of the guided lift system of FIG. 2A with a lift vehicle raising the payload according to various embodiments presented herein;

FIG. 5A is a top view of a guided lift system utilizing two control tethers according to various embodiments presented herein;

FIG. 5B is a top view of a guided lift system utilizing three control tethers according to various embodiments presented herein;

DETAILED DESCRIPTION

Figure 1:
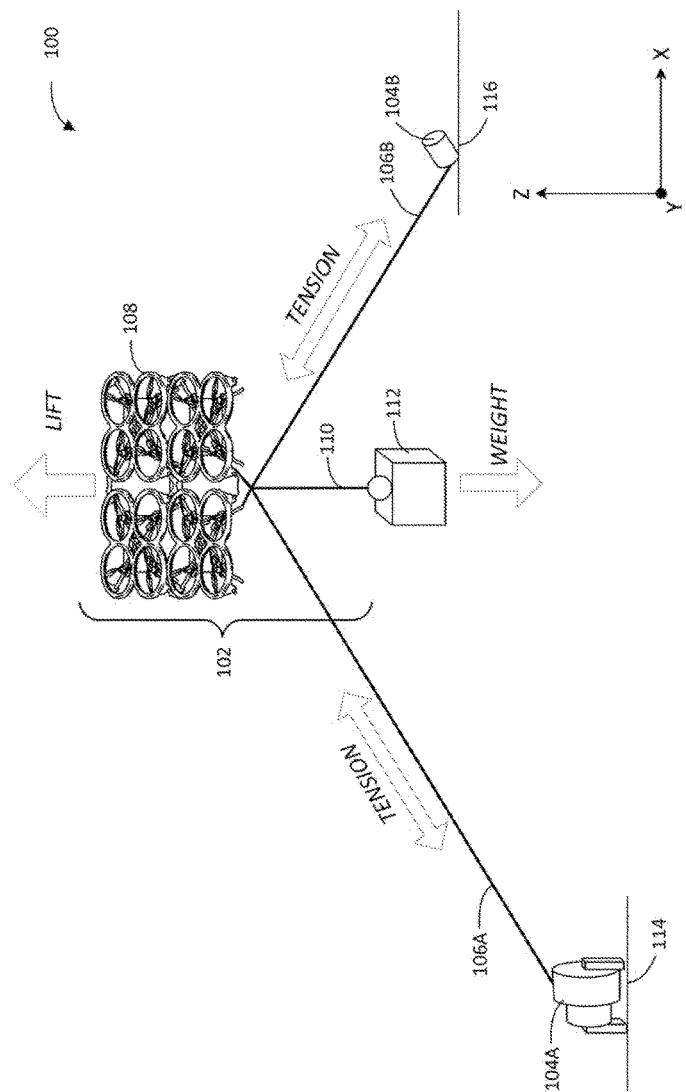
FIG. 1 is a perspective view of a guided lift system according to various embodiments presented herein.

The following detailed description is directed to a guided lift system and method that utilizes aerodynamic lift generated by a lift vehicle to lift a payload, while utilizing tethers and fixed control units to precisely control the positioning of the lift vehicle and corresponding payload. As discussed above, traditional lifting operations may involve unmanned aerial vehicles used for lifting and transporting payloads from one location to another. Maneuvering a lift vehicle remotely often relies on the skill of an operator to control the lift vehicle when precisely maneuvering and delivering the payload, often in areas with limited operating space for the lift vehicle, or with limited visibility for the operator. Additionally, as discussed above, remotely piloted lift vehicles utilize complex sensor suites to determine, monitor, and correct altitude, attitude, airspeed, and any other type of necessary or desired parameters associated with the vehicle, the environment, or the payload. Whenever sensors and corresponding processing capability are added to a system, the cost, weight, and reliability of the vehicles and overall system are negatively impacted.

Utilizing the concepts and technologies described herein, a guided lift system and corresponding method for maneuvering a payload includes a lift vehicle and an attached control system. According to various embodiments, the lift vehicle is used for providing a quantity of aerodynamic lift that exceeds the weight of the attached payload, while the attached control system is used to maneuver the lift vehicle and payload. In other words, the lift vehicle provides a vertical lift component that simply lifts the payload, without relying on flying the payload from one position to another, or controlling flight along a flight route using thrust, pitch, roll, and yaw controls.

According to embodiments described herein, the altitude or distance to which the payload is lifted, as well as the two dimensional movement to reposition the payload, may be controlled via the control system. The control system incorporates two or more control tethers attached to the lift vehicle, payload, or the payload tether. The control tethers are anchored to the ground, a vehicle, or a structure (e.g., a building) via control units at positions that allow for manipulation of the control tethers to maneuver the lift vehicle and payload as desired.

According to various embodiments, the control units may include motorized winch assemblies. The payload may be lifted with the lift vehicle to a desired altitude by lengthening each of two control tethers using the motorized winch assemblies. The motorized winch assemblies may be positioned on opposing sides of the origination and destination locations of the payload so that the origination and destination locations are arranged collinearly with the motorized winch assemblies. By coordinating the lengthening and shortening of the control tethers, the lift vehicle and corresponding payload may be pulled and maneuvered to deliver the payload to the destination location. If a third (or more) control tether is used, then the payload may be maneuvered to any position within a space defined between the motorized winch assemblies.

This system and the various embodiments described below provides users with the ability to precisely maneuver a payload using a lift vehicle that does not require an extensive sensor suite, flight control capability, or a skilled remote operator. In addition, the guided lift system described herein increases the safety of payload delivery operations since the lift vehicle and payload is unable to inadvertently fly into undesired areas and cause damage to persons, structures, the payload, or the lift vehicle since it is tethered and guided using control units fixed to specific locations attached to the ground, a vehicle, or a structure. Moreover, the guided lift system described below decreases the setup and delivery time as compared to a traditional lifting operation.

In the following detailed description, references are made to the accompanying drawings that form a part hereof, and which are shown by way of illustration, specific embodiments, or examples. Referring now to the drawings, in which like numerals represent like elements through the several figures, a guided lift system and method for employing the same according to the various embodiments will be described.

FIG. 1 shows a perspective view of guided lift system 100 according to various embodiments. The guided lift system 100 includes a lift unit 102 and two control units 104A and 104B (referred to generally and collectively as "control units 104"). The lift unit 102 includes a lift vehicle 108 and a payload tether 110, which secures the payload 112 to the lift vehicle 108. For the purposes of this disclosure, the lift vehicle 108 may include any device or mechanism capable of lifting the payload 112. According to various embodiments described below and shown in the various figures, the lift vehicle 108 may include a modular vehicle lift system as disclosed in U.S. patent application Ser. No. 13/925,305, entitled "Modular Vehicle Lift System," filed on Jun. 24, 2013, which is incorporated in its entirety herein. As described below with respect to FIGS. 4A-4C, according to alternative embodiments, the lift vehicle 108 may include a helicopter, crane, or any other mechanism for lifting the payload 112.

The control units 104 may include any mechanism for adjusting the length of the control tethers 106 with respect to the distance between each control unit 104 and the lift unit 102. According to one embodiment, one or more of the control units may be a motorized winch assembly. The motorized winch assembly is operative to pull the associated control tether 106 toward the winch assembly, shortening the distance between the winch assembly and the lift unit 102. Each winch assembly is also operative to release the control tether 106 under tension to allow the lift unit 102 to rise and/or to be pulled toward another winch assembly that is pulling the lift unit 102. One or more of the control units 104 may alternatively a manual winch assembly or pulley system.

The lift unit 102 and attached payload 112 are secured to the control units 104 at a first position 114 and a second position 116. The first position 114 and the second position 116 may correspond to the ground, a vehicle, or a structure. The first position 114 of the first control unit 104A and the second position 116 of the second control unit 104B define the outer boundaries of the potential areas of delivery for the payload 112. In other words, the guided lift system 100 may operate to move the payload 112 between positions located within the boundaries set by the first control unit 104A and the second control unit 104B, as well as by the direction of the lift component associated with the lift vehicle 108. Further details with respect to defining the payload movement boundaries and how the direction of the lift component of the lift vehicle affects those boundaries will be provided below with respect to FIGS. 5A, 5B, and 6.

While the lift vehicle 108 operates to lift the payload 112 in the vertical, or Z direction as indicated by the coordinate system shown in FIG. 1, the control units 104 and corresponding control tethers 106A and 106B (referred to generally and collectively as "control tethers 106") are used to move the payload 112 in the X-Y directions. As discussed above, the movement of the payload 112 in the X-Y direction is controlled through the coordinated pulling and release of the control tethers 106 using the control units 104 to pull the lift unit 102 and attached payload 112 to the desired location.

For example, looking at FIG. 1, the control unit 104A is located at a first position 114. The control unit 104A may be fixed to the first position 114 via an anchor into the ground, attachment to a vehicle, or attachment to a structure, (e.g., a building). Similarly, the control unit 104B is located at a second position 116. The control unit 104A is adjustably coupled to a control tether 106A that is attached to the lift unit 102, while control unit 104B is adjustably coupled to a control tether 106B that is also attached to the lift unit 102.

For the purposes of this disclosure, "adjustably coupled" means that a control unit 104 that is fixed to a position is coupled to the control tether 106 to secure the control tether at that position. However, the control unit 104 is operative to selectively pull the control tether 106 toward the control unit 104 to shorten the length of the control tether 106 between the control unit 104 and the lift unit 102. Similarly, the control unit 104 is operative to selectively release the control tether 106 to allow the lift unit 102 to rise and/or to be pulled away from the control unit 104, which lengthens the distance between the control unit 104 and the lift unit 102. In this manner, each control unit 104 described herein may be adjustably coupled to a control tether 106, which is attached to a lift unit 102 or payload 112 at an opposing end of the control tether 106.

Returning to the example in FIG. 1, by coordinating the length adjustments of the control tethers 106A and 106B using control units 104A and 104B, respectively, the lift unit 102 and payload 112 may be moved in the X-Y direction between the first position 114 and the second position 116. For example, to move the payload 112 to the right toward control unit 104B at the second position 116, the control unit 104B shortens the control tether 106B. In an implementation in which the control unit 104B is a motorized winch assembly, the winch may operate to wind the control tether 106B onto a spool to shorten the control tether 106B, or more specifically, to shorten the distance between the control unit 104B and the lift unit 102. However, in order to move the payload 112 towards the control unit 104B, the control unit 104A releases the control tether 106A at a coordinated rate with respect to the spooling of the control tether 106B to move the lift unit 102 toward the second position 116 while controlling the altitude of the lift unit 102 and payload 112 as necessary to avoid any obstacles.

The tension in the control tethers 106 provides stability to the payload 112 during movement. As previously discussed, the tension is applied using aerodynamic lift from the lift vehicle 108 that exceeds the weight of the payload 112 and lift unit 102. According to some embodiments, increasing the tension generally improves stability, while conversely, the stability of the payload 112 decreases as the differential between the lift and weight decreases. According to one non-limiting implementation, the thrust or aerodynamic lift from the lift vehicle 108 exceeds the weight of the lift unit 102 and payload 112 by at least 125%.

To maneuver the payload 112 in the X and Z directions, the operation of the control units 104A and 104B will be described in the context of shortening and lengthening the corresponding control tethers 106A and 106B, respectively. Movement in the X and Z directions may be generally controlled as follows:
  Movement upward in Z direction while maintaining X position:
    Lengthen both control tethers 106A and 106B at similar rates;
  Movement downward in Z direction while maintaining X position:
    Shorten both control tethers 106A and 106B at similar rates;
  Maintain altitude in Z direction while moving toward the first position 114:
    Shorten control tether 106A and lengthen control tether 106B at similar rates;
  Maintain altitude in Z direction while moving toward the second position 116:
    Shorten control tether 106B and lengthen control tether 106A at similar rates;
  Movement upward in Z direction while moving toward the first position 114:
    Shorten control tether 106A while lengthening control tether 106B at a faster rate;
  Movement upward in Z direction while moving toward the second position 116:
    Shorten control tether 106B while lengthening control tether 106A at a faster rate;
  Movement downward in Z direction while moving toward the first position 114:
    Shorten control tether 106A while lengthening control tether 106B at a slower rate; and
  Movement downward in Z direction while moving toward the second position 116:
    Shorten control tether 106B while lengthening control tether 106A at a slower rate.

Figure 2A:
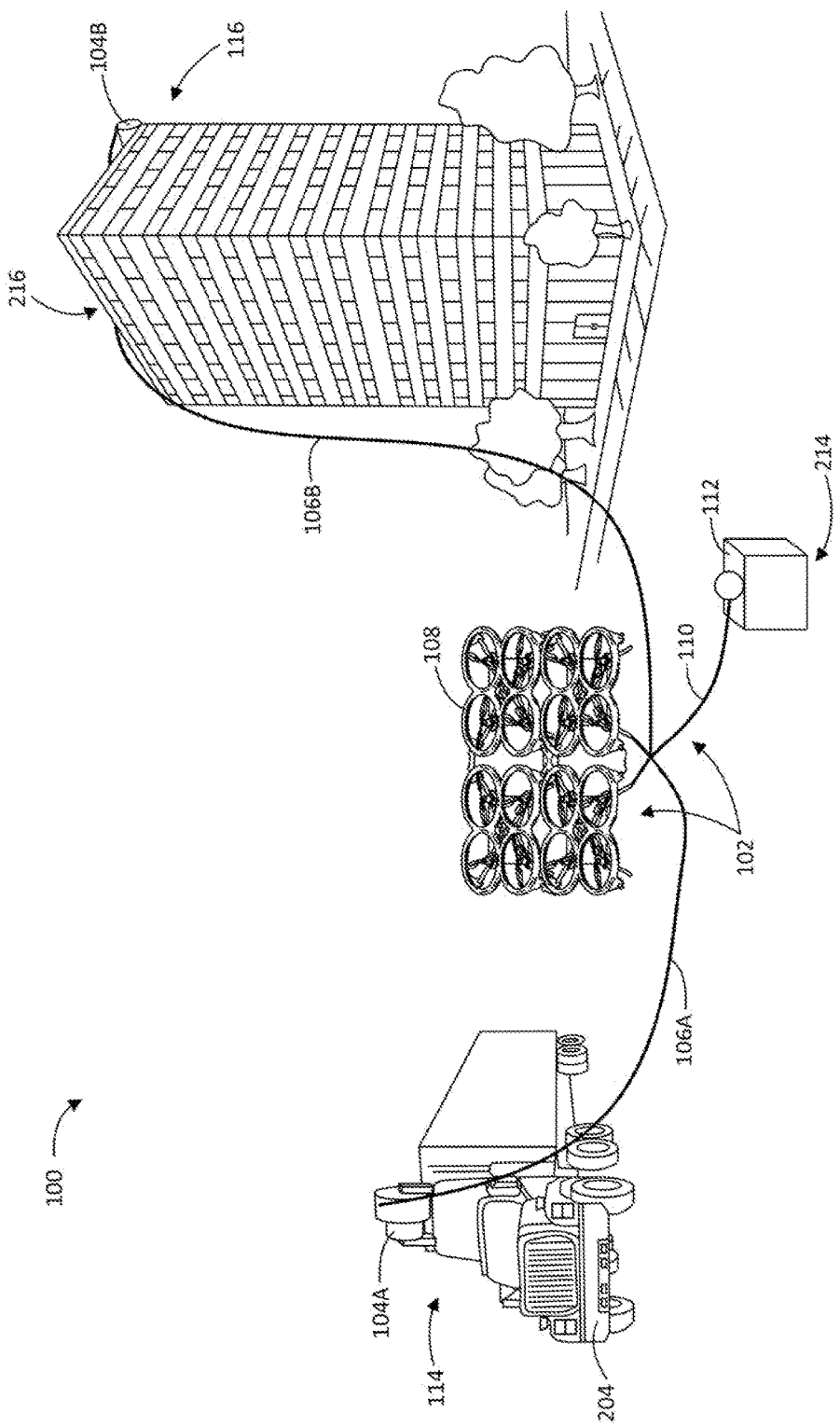
FIG. 2A is a perspective view of a guided lift system prepared for payload delivery with the payload located at an origination location according to various embodiments presented herein.

Turning now to FIGS. 2A-2E, an example will be provided according to one embodiment to illustrate the repositioning of a payload 112 from an origination location 214 on the ground to a destination location 216 on a rooftop of a building. FIG. 2A shows a guided lift system 100 in which a lift unit 102 is attached to the payload 112 located at the origination location 214. In this example, the control unit 104A is attached to a vehicle 204. It may be advantageous to fix the control unit 104A to a truck that is used to transport the guided lift system 100, including the lift vehicle 108, control tethers 106, payload tether 110, second control unit 104B, as well as any additional control units 104. In this example, the control unit 104A may be fixed or removably attached to any portion of the vehicle 204.

FIG. 2B shows the guided lift system 100 after the lift vehicle 108 has vertically raised the payload 112 off of the ground in the Z direction. As previously discussed, one advantage of the guided lift system 100 described herein is that the lift vehicle 108 may be configured to simply provide a lift vector 220 that fixed or preset to a quantity that overcomes the weight of the payload 112 and provides the desired tension in the control tethers 106 to provide stability to the guided lift system 100. The altitude of the lift unit 102 and payload 112 may be controlled by adjusting the length of control tethers 106A and 106B. In this example, the altitude in the Z direction may depend on the height of the building and any obstacles on the rooftop at the destination location 216.

FIG. 2B shows a power symbol 222 on the control tether 106A. The power symbol 222 shown here is used to indicated that one or both of the control tethers 106 may include a power and/or data line from a power source (not shown) or controller for the purposes of providing power or command inputs to the lift vehicle 108. By removing the power source from the lift vehicle 108, the weight, cost, and complexity of the lift vehicle 108 may be further mitigated. Although the power symbol 222 is only shown as being associated with the control tether 106A in FIG. 2B for clarity purposes, it should be understood that any or none of the control tethers 206 may be utilized for supplying power and/or data according to all embodiments discussed herein. According to one embodiment, the control tethers 106A and 106B may be used to supply power to the lift vehicle 108 and/or to the control unit 104B from the vehicle 204 or a power source associated with the control unit 104A. It should also be appreciated that the lift vehicle 108 and control units 104 may receive power from one or more external or onboard sources without the use of a powered control tether.

Figure 2C:
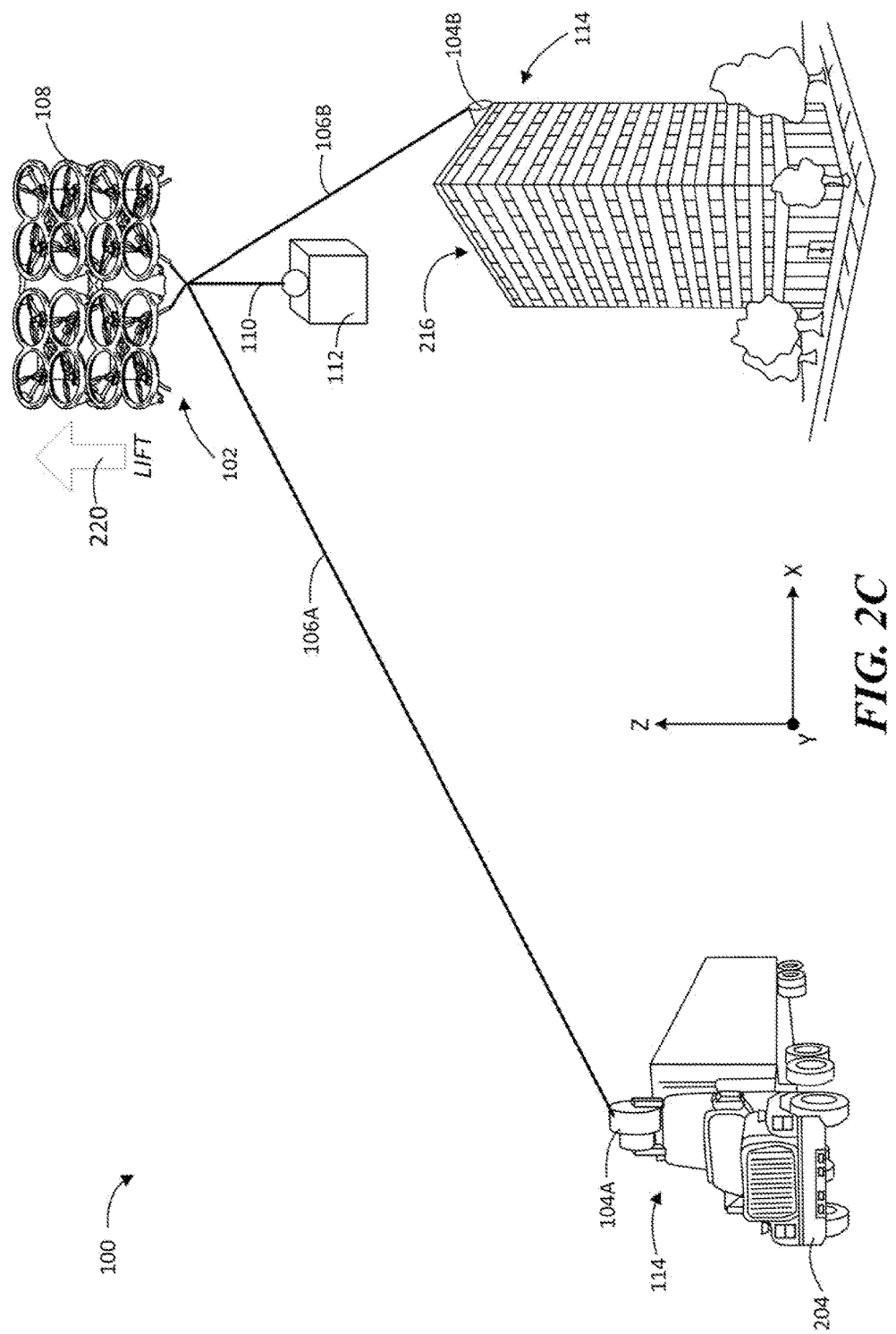
FIG. 2C is a perspective view of the guided lift system of FIG. 2A with the lift vehicle and payload positioned proximate to a destination location according to various embodiments presented herein.

FIG. 2C shows the guided lift system 100 after the lift vehicle 108 has moved laterally in the X direction to a position above the destination location 216. In this example, to move between the position shown in FIG. 2B to the position over the destination location 216 as shown in FIG. 2C, the control unit 104B shortens the control tether 106B by winding the tether onto a spool. While the control tether 106B is being shortened, the control unit 104A is lengthening the control tether 106A at a rate that enables the lift unit 102 to maintain altitude while being pulled in the X direction towards the destination location 216.

Figure 2D:
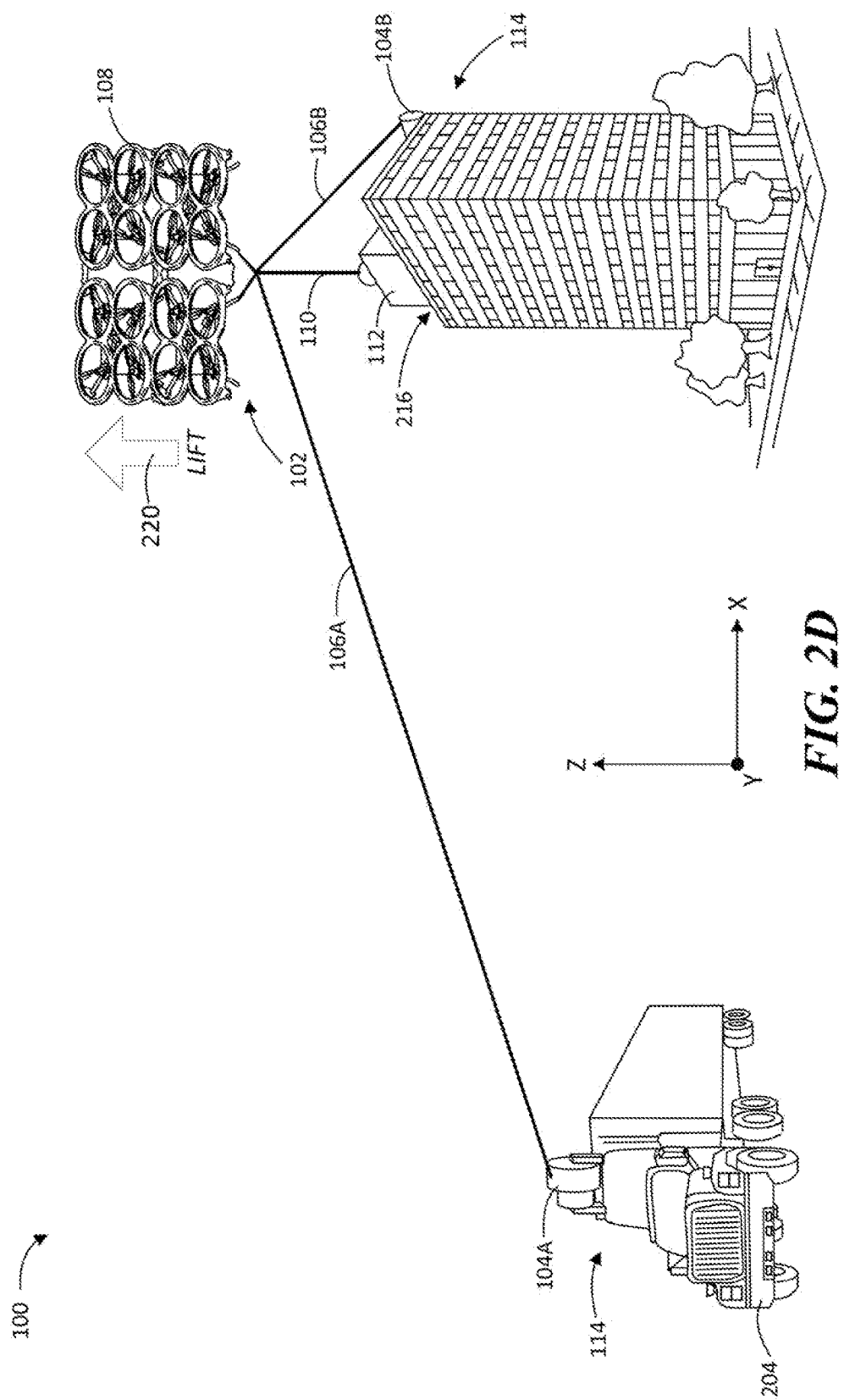
FIG. 2D is a perspective view of the guided lift system of FIG. 2A with the payload placed into position at the destination location according to various embodiments presented herein.
Figure 2E:
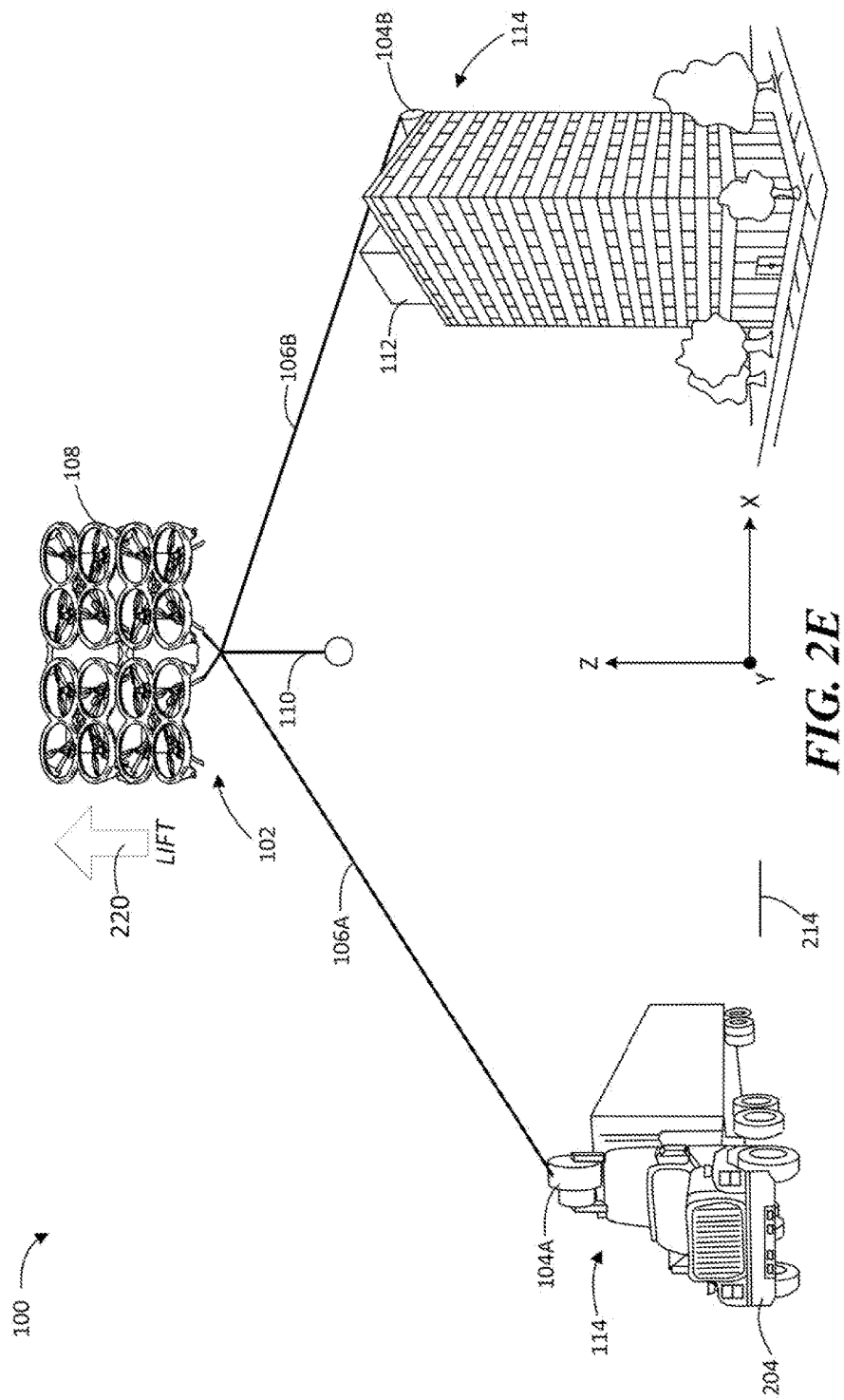
FIG. 2E is a perspective view of the guided lift system of FIG. 2A with the lift unit returning to the origination location after payload delivery according to various embodiments presented herein.

In FIG. 2D, the control unit 104B continues to shorten the control tether 106B while the control unit 104A maintains or shortens the length of the control tether 106A, which pulls the lift unit 102 and corresponding payload 112 downwards into position at the destination location 216 on the rooftop of the building. During the final positioning of the payload 112, the control units 104A and 104B may be coordinated to adjust the lengths of the control tethers 106A and 106B, respectively, to effectuate minor adjustments to the X positioning of the payload while lowering the payload 112 into the destination location 216. As shown in FIG. 2E, after releasing the payload 112 from the payload tether 110, the lift unit 102 may be pulled back toward origination location 214 to pick up an additional payload for delivery, or for powering down and stowage.

Figure 3C:
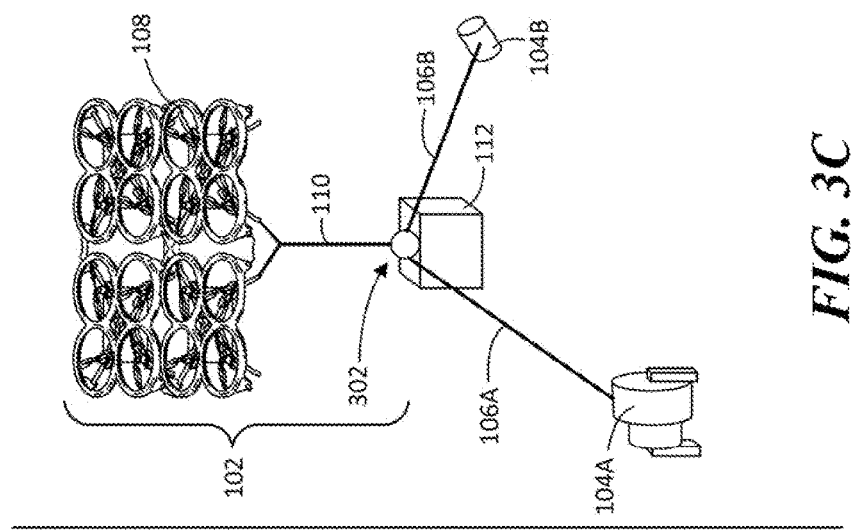
FIGS. 3A-3C are perspective views of a guided lift system utilizing an attachment point for the control tethers at the lift vehicle, at the payload tether, and at the payload, respectively, according to various embodiments presented herein.
Figure 3B:
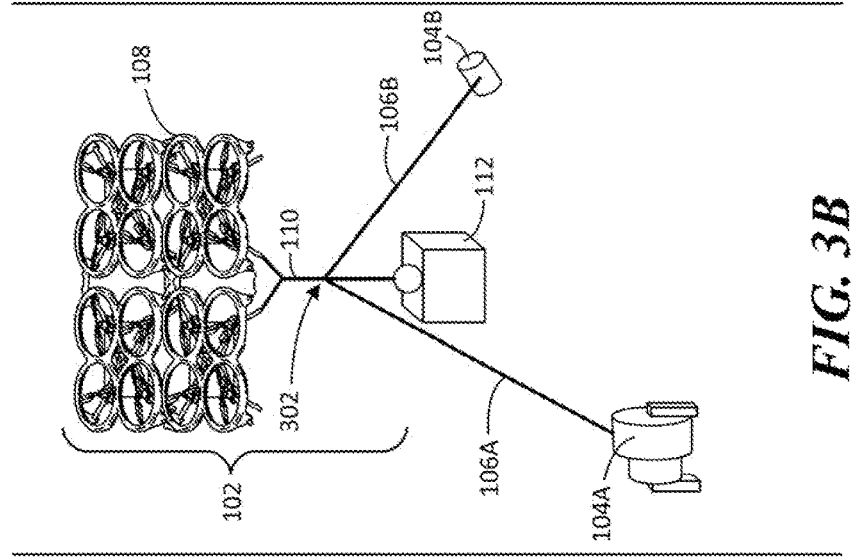
Figure 3A:
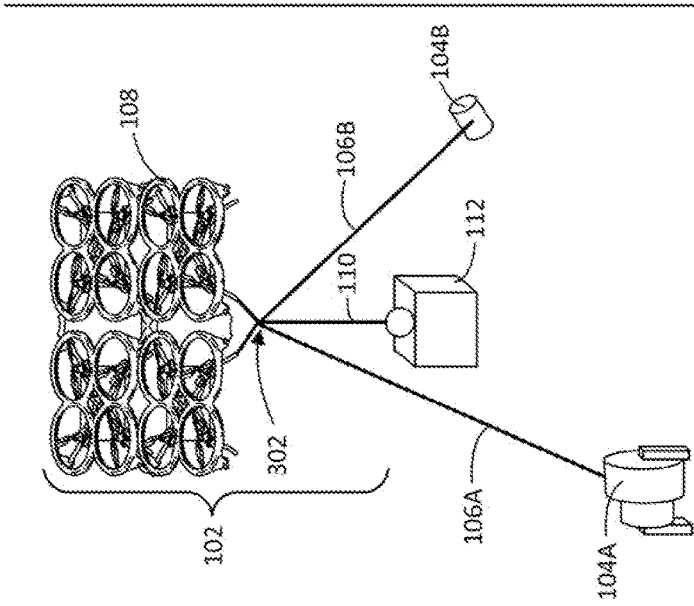

FIGS. 3A-3C show three embodiments for utilizing an attachment point 302 for the control tethers 106. The attachment point 302 may be located at the lift vehicle 108, at the payload tether 110, and at the payload 112. FIG. 3A shows one embodiment in which the control tethers 106A and 106B are attached to the lift unit 102 at an attachment point 302 located at the lift vehicle 108. While this example shows each control tether 106A and 106B connected to the lift vehicle 108 at a single point below the lift vehicle 108, it should be appreciated that the control tethers 106A and 106B may be attached to opposing sides or corners of the lift vehicle 108, or to any positions on or proximate to the lift vehicle 108. FIG. 3B shows one embodiment in which the control tethers 106A and 106B are attached to the lift unit 102 at an attachment point 302 located one the payload tether 110. FIG. 3C shows one embodiment in which the control tethers 106A and 106B are attached to the lift unit 102 at an attachment point 302 at the payload 112.

The embodiment shown in FIG. 3A in which the attachment point 302 is located on or near the lift vehicle 108 may provide increased control over the payload 112 than the alternative embodiments shown in FIGS. 3B and 3C, at least with respect to the embodiment shown in FIG. 3B, since control is being applied to the source of the aerodynamic lift. The embodiment shown in FIG. 3C may be beneficial in some implementations since movement control is applied directly to the payload, eliminating any disadvantages associated with swinging of the payload 112 on the payload tether 110 due to an attachment point 302 being located on or above the payload tether 110. It should also be understood that while FIGS. 3A-3C show the payload 112 attached to the lift vehicle 108 via a payload tether 110, the payload 112 may alternatively be attached directly to the lift vehicle 108 without the use of a payload tether 110. In this embodiment, the lift unit 102 includes the lift vehicle 108 and any direct attachment hardware for coupling the lift vehicle 108 directly to the payload 112 without a payload tether 110.

Figure 4C:
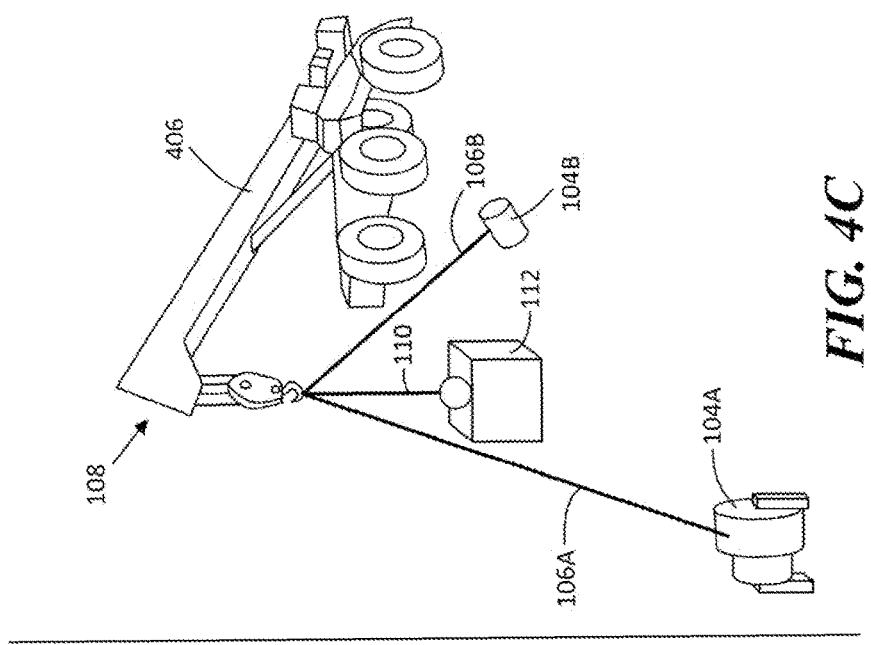
FIGS. 4A-4C are perspective views of a guided lift system utilizing a lift vehicle corresponding to a modular vehicle lift system, a helicopter, and a crane, respectively, according to various embodiments presented herein.
Figure 4B:
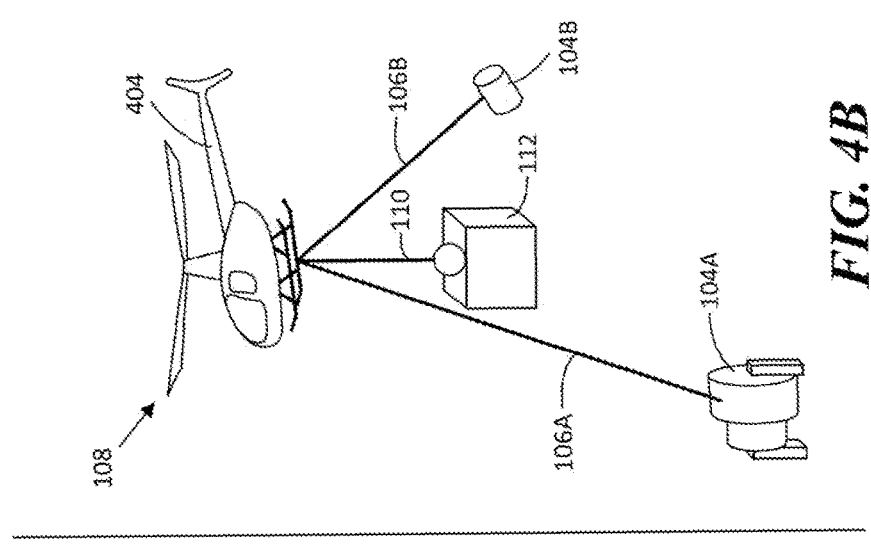
Figure 4A:
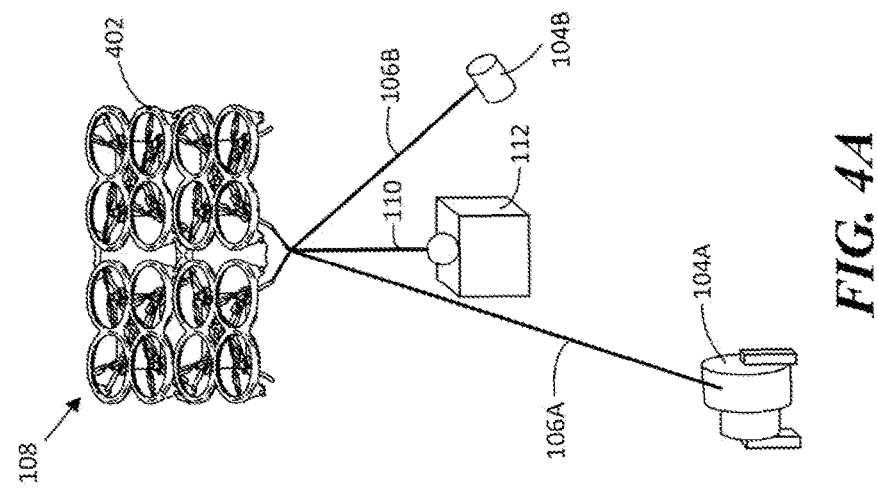

FIGS. 4A-4C show various embodiments for the lift vehicle 108. FIG. 4A shows an embodiment in which the lift vehicle 108 includes a modular vehicle lift system 402, as described above. Alternatively, FIG. 4B shows a lift vehicle 108 that includes a helicopter 404, while FIG. 4C shows a lift vehicle 108 that includes a crane 406. In all of these embodiments, the lift vehicle 108 includes a mechanism for lifting the payload 112, while the control units 104 and corresponding control tethers provide a mechanism for controlling the movement of the payload 112. It should be appreciated that the lift vehicle 108 is not limited to the specific implementations described herein. Rather, the lift vehicle 108 may include any mechanism that is capable of lifting the payload 112.

FIG. 5A is a top view of a guided lift system 100 utilizing two control tethers 106 to maneuver a payload 112 according to various embodiments presented herein. This is example is similar to the example described above with respect to FIGS. 2A-2E. Utilizing two control tethers 106, the lift vehicle 108 and payload 112 may be pulled in the X-Y direction to any destination location 216 positioned linearly between the first position 114 associated with the first control unit 104A and the second position 116 associated with the second control unit 104B. For the purposes of this example, if the destination location 216 is associated with a rooftop 500, the destination location 216 is defined by a broken line showing the various positions on the rooftop 500 at which the payload 112 may be delivered. As can be seen by the broken line in FIG. 5A, the destination location 216 is limited to those positions that are linearly between the control units 104A and 104B. In order to deliver the payload 112 to a location that is outside of the destination location 216 defined by the broken lines in this example, one or both of the control units 104A and 104B need to be relocated, unless a non-vertical thrust component is employed as described further below with respect to FIGS. 6A and 6B.

However, as depicted in FIG. 5B, the area defining the destination location 216 may be significantly expanded when three or more control units 104 and corresponding control tethers 106 are used. FIG. 5B shows a top view of a guided lift system 100 utilizing three control tethers 106 to maneuver a payload 112 according to various embodiments presented herein. Utilizing three control units 104A, 104B, and 104C allows for coordinated adjustments of the corresponding control tethers 106A, 106B, and 106C, respectively, to move the payload to any location in the X-Y direction that is located within an area bounded by the control units 104. For illustrative purposes, the possible delivery areas for the payload 112 on the rooftop 500 are shown as the delivery location 216 defined by the broken line. As seen, the delivery location 216 options in the example of FIG. 5B utilizing three control units 104 are significantly greater than the delivery location 216 options of the example of FIG. 5A, which only utilizes two control units 104.

Figure 6A:
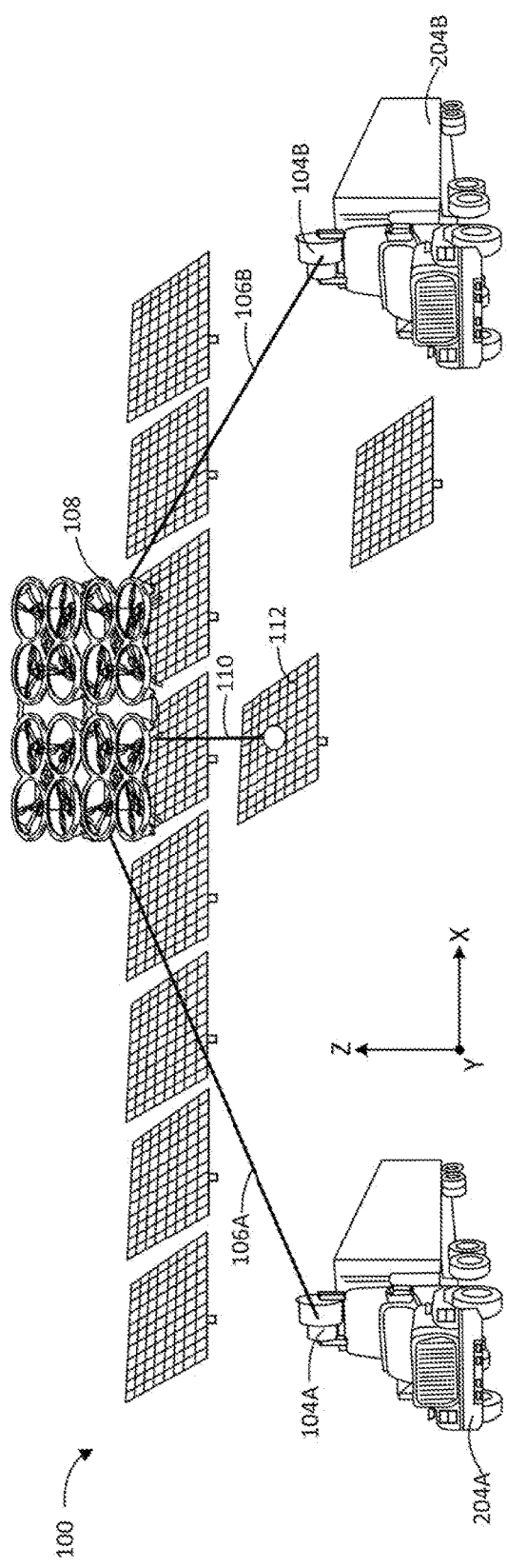
FIG. 6A is a perspective view of the guided lift system showing offset delivery of a payload using two control tethers and a non-vertical lift component according to various embodiments presented herein.

Looking at FIGS. 6A and 6B, an embodiment utilizing a non-vertical thrust component with the lift vehicle 108 will now be described. FIG. 6A shows an example payload delivery scenario in which the guided lift system 100 is used to deliver solar panels from an origination location 214 to a destination location 216 that is not linearly aligned with the origination location 214 and the first position 114 of the first control unit 104A and the second position of the second control unit 104B. This implementation may be applicable in situations in which the vehicles 204A and 204B associated with the first control unit 104A and the second control unit 104B, respectively, may not be positioned within or around the desired destination location 216 of the payload. In the example shown, the trucks 204A and 204B have access to the front side of the solar panel array, but may not be maneuvered behind the solar panel array.

Figure 6B:
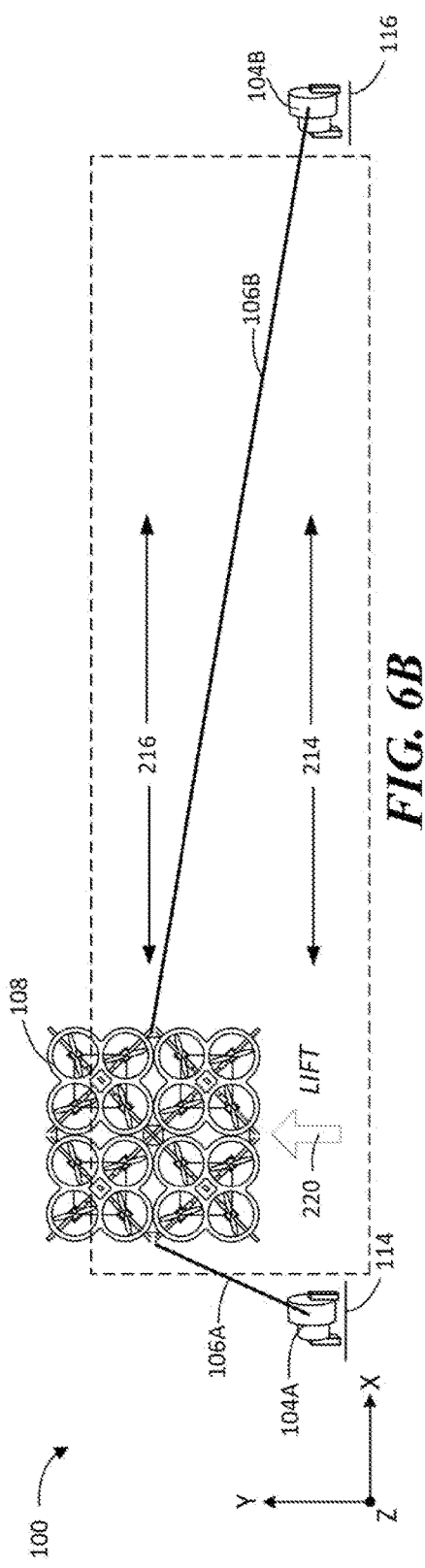
FIG. 6B is a top view of the guided lift system of FIG. 6A according to various embodiments presented herein.

FIG. 6B shows a top view of the guided lift system 100 of FIG. 6A. In this view, it can be seen that the destination locations 216 for the solar panels being installed are linearly offset from a line intersecting the first position 114 of the first control unit 104A and the second position of the second control unit 104B, which is where the origination locations 214 of the various solar panels are located. In order to maneuver the payloads 112 from the origination location 214 to the destination locations 216, the lift vector 220 may include a non-vertical component. In this example, the lift vehicle 108 may be configured to provide a fixed thrust that exceeds the weight of the solar panels being delivered. However, the fixed thrust is oriented at an angle that includes a vertical component that exceeds the weight of the payload 112 and a horizontal or non-vertical component that moves the lift unit 102 and payload 112 in the Y direction. The broken line defines the options for the destination locations 216 in this example.

It should be clear from the examples provided by FIGS. 5A, 5B, 6A, and 6B that a payload 112 may be delivered to destination locations 216 that are offset from a line intersecting the first position 114 of a first control unit 104A and the second position of a second control unit 104B in a least two ways. First, three or more control units 104 may be used, as shown and described above with respect to FIGS. 5A and 5B. Second, a lift system 100 may include only two control units 104, but the lift vehicle 108 may be configured with a non-vertical lift component to move the payload in the Y direction, offset from a line intersecting the two control units 104.

Figure 7:
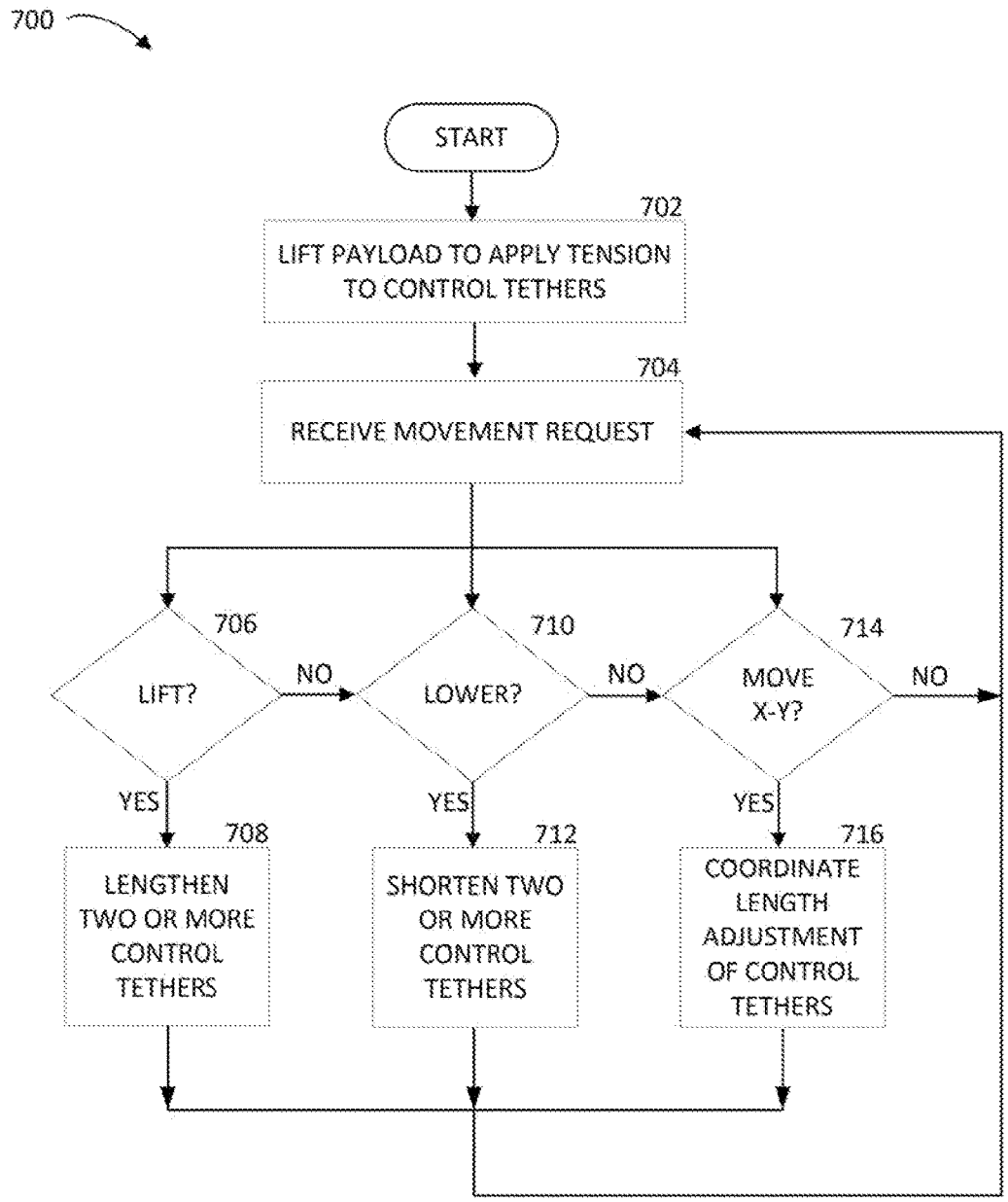
FIG. 7 is a flow diagram showing a method of maneuvering a payload according to various embodiments presented herein.

Turning now to FIG. 7, additional details will be provided regarding embodiments presented herein for maneuvering a payload 112 utilizing a guided lift system 100. It should be appreciated that the logical operations described herein may be implemented (1) as a sequence of computer implemented acts or program modules running on a computing system and/or (2) as interconnected machine logic circuits or circuit modules within the computing system. The implementation is a matter of choice dependent on the performance and other operating parameters of the computing system. Accordingly, the logical operations described herein are referred to variously as operations, structural devices, acts, or modules. These operations, structural devices, acts, and modules may be implemented in software, in firmware, hardware, in special purpose digital logic, and any combination thereof. It should also be appreciated that more or fewer operations may be performed than shown in the figures and described herein. These operations may also be performed in parallel, or in a different order than those described herein.

FIG. 7 shows a routine 700 for maneuvering a payload 112 utilizing a guided lift system 100. The routine 700 begins at operation 702, where the payload 112 is lifted to apply tension to the control tethers 106. The amount of aerodynamic lift provided by the lift vehicle 108 may be predetermined according to the weight of the payload 112 and the desired amount of tension in the control tethers 106. At operation 704, a movement request is received to maneuver the payload 112. The movement request may be an adjustment to the tension in one or more of the control tethers 106. Alternatively, the guided lift system 100 may include a controller that is communicatively linked to the control units 104 and operative to activate and deactivate each control unit 104 to shorten and lengthen the control tethers 106 appropriately to maneuver the lift unit 102 and corresponding payload 112. The controller may include a user interface that enables a user to provide a control input such as raise, lower, right, left, forward, and backward. The controller receives the input, or movement request, and provides corresponding control signals to the control units to effectuate the movement. The controller may receive input and provide corresponding control signals via wired or wireless paths, including the use of one or more control tethers 106 for providing the control signals to the control units 104 or lift vehicle 108.

From operation 704, the routine 700 continues to operation 706, 710, and/or 714 depending on the movement request. At operation 706, a determination is made as to whether or not the movement request includes a request to lift the payload 112. If the movement request includes a request to lift the payload 112, then the routine 700 continues to operation 708, where two or more control tethers 106 are lengthened to raise the lift vehicle 108 and attached payload 112. For example, referring to FIG. 1, in response to a movement request to lift the payload 112, the control units 104A and 104B are activated to simultaneously lengthen both control tethers 106A and 106B. Because the aerodynamic lift generated by the lift vehicle 108 is greater than the weight of the payload 112, lengthening the control tethers 106A and 106B raises the payload 112. From operation 708, the routine 700 returns to operation 704 and continues in response to additional movement requests.

Returning to operation 706, if the movement request does not include a request to lift the payload 112, or if the movement request includes a request to lower the payload 112, the routine 700 proceeds to operation 710. At operation 710, a determination is made as to whether or not the movement request includes a request to lower the payload 112. If the movement request includes a request to lower the payload 112, then the routine 700 continues to operation 712, where two or more control tethers 106 are shortened to lower the lift vehicle 108 and attached payload 112. For example, referring again to FIG. 1, in response to a movement request to lower the payload 112, the control units 104A and 104B are activated to simultaneously shorten both control tethers 106A and 106B. Shortening the control tethers 106A and 106B pulls the payload 112 downward in the Z direction to lower the payload 112. From operation 710, the routine 700 returns to operation 704 and continues in response to additional movement requests.

Returning to operation 710, if the movement request does not include a request to lower the payload 112, or if the movement request includes a request to move the payload 112 in the X-Y direction, the routine 700 proceeds to operation 714. At operation 714, a determination is made as to whether or not the movement request includes a request to move the payload 112 in the X-Y direction. If the movement request includes a request to move the payload 112 in the X-Y direction, then the routine 700 continues to operation 716, where two or more control units 104 are coordinated to adjust the lengths of the control tethers 106 to move the lift vehicle 108 and attached payload 112 according to the movement request. For example, referring again to FIG. 1, in response to a movement request to move the payload 112 to the right, the control units 104A and 104B are activated to simultaneously shorten control tethers 106B and lengthen control tether 106A. From operation 716, the routine 700 returns to operation 704 and continues in response to additional movement requests.

Figure 8:
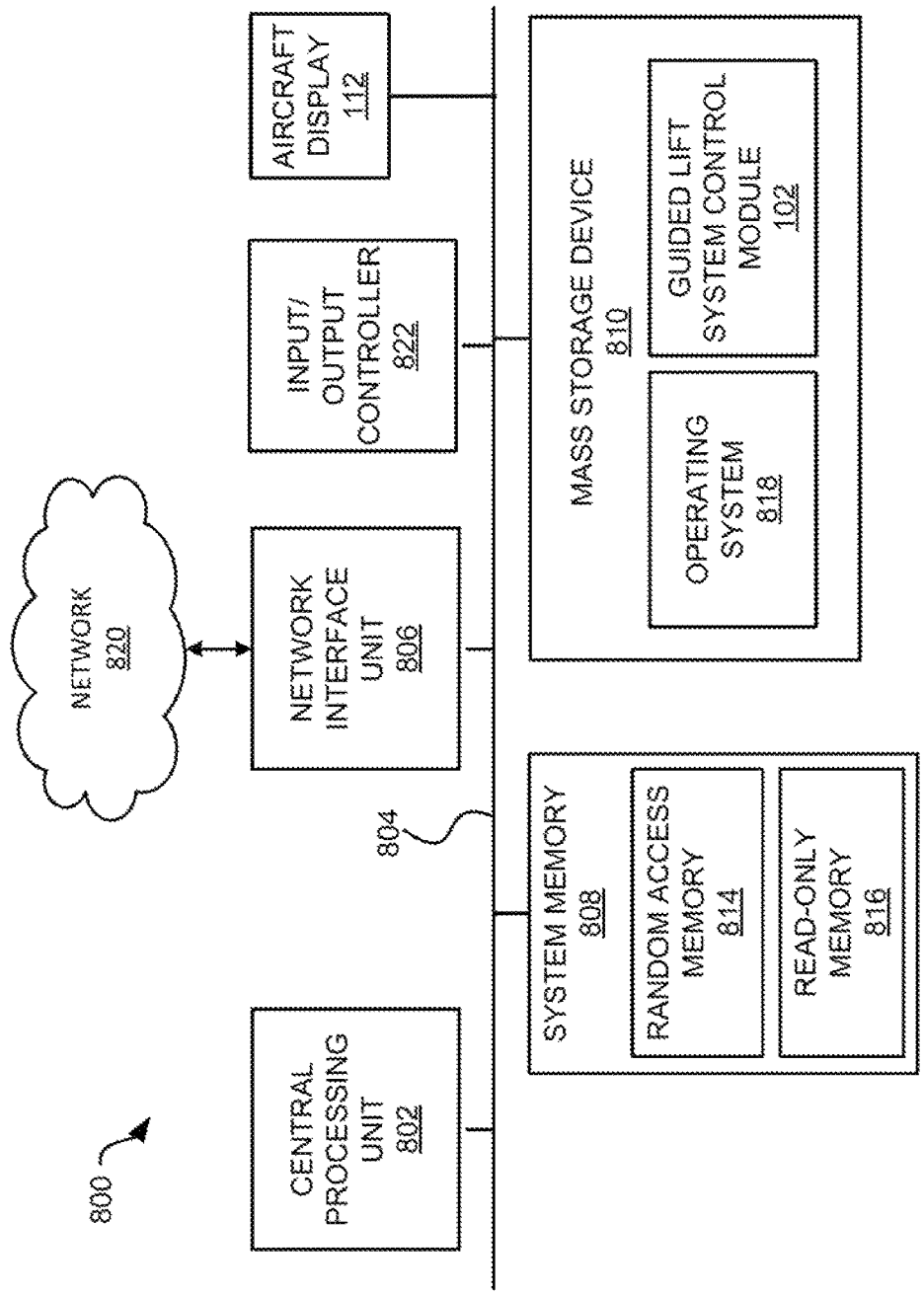
FIG. 8 is a computer architecture diagram of a controller for coordinating operation of at least two control units for maneuvering a payload according to various embodiments presented herein.

FIG. 8 shows an illustrative computer architecture 800 of a controller described above, capable of executing the software components described herein for maneuvering a payload 112 with a guided lift system 100 in the manner presented above. The computer architecture 800 includes a central processing unit 802 (CPU), a system memory 808, including a random access memory 814 (RAM) and a read-only memory 816 (ROM), and a system bus 804 that couples the memory to the CPU 802.

The CPU 802 is a standard programmable processor that performs arithmetic and logical operations necessary for the operation of the computer architecture 800. The CPU 802 may perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The computer architecture 800 also includes a mass storage device 810 for storing an operating or control system 818, as well as specific application modules or other program modules, such as a guided lift system control module 812 operative to provide control input to the control units 104 to maneuver the payload 112 according to the various embodiments described above. The mass storage device 810 is connected to the CPU 802 through a mass storage controller (not shown) connected to the bus 804. The mass storage device 810 and its associated computer-readable media provide non-volatile storage for the computer architecture 800.

The computer architecture 800 may store data on the mass storage device 810 by transforming the physical state of the mass storage device to reflect the information being stored. The specific transformation of physical state may depend on various factors, in different implementations of this description. Examples of such factors may include, but are not limited to, the technology used to implement the mass storage device 810, whether the mass storage device is characterized as primary or secondary storage, and the like. For example, the computer architecture 800 may store information to the mass storage device 810 by issuing instructions through the storage controller to alter the magnetic characteristics of a particular location within a magnetic disk drive device, the reflective or refractive characteristics of a particular location in an optical storage device, or the electrical characteristics of a particular capacitor, transistor, or other discrete component in a solid-state storage device. Other transformations of physical media are possible without departing from the scope and spirit of the present description, with the foregoing examples provided only to facilitate this description. The computer architecture 800 may further read information from the mass storage device 810 by detecting the physical states or characteristics of one or more particular locations within the mass storage device.

Although the description of computer-readable media contained herein refers to a mass storage device, such as a hard disk or CD-ROM drive, it should be appreciated by those skilled in the art that computer-readable media can be any available computer storage media that can be accessed by the computer architecture 800. By way of example, and not limitation, computer-readable media may include volatile and non-volatile, removable and non-removable media implemented in any method or technology for storage of information such as computer-readable instructions, data structures, program modules, or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by the computer architecture 800.

According to various embodiments, the computer architecture 800 may operate in a networked environment using logical connections to other aircraft systems and remote computers through a network, such as the network 820. The computer architecture 800 may connect to the network 820 through a network interface unit 806 connected to the bus 804. It should be appreciated that the network interface unit 806 may also be utilized to connect to other types of networks and remote computer systems. The computer architecture 800 may also include an input-output controller 822 for receiving and processing input from a number of other devices, including a control display unit, an EFIS control panel, a keyboard, mouse, electronic stylus, or touch screen that may be present on a connected aircraft display 112. Similarly, the input-output controller 822 may provide output to the aircraft display 112, a printer, or other type of output device. According to embodiments, the aircraft display 112 may be a map display such as the ND 202, or a non-map display, such as a PFD 402, a HUD 602, a control display unit, an electronic flight bag or other display device in the aircraft.

Based on the foregoing, it should be appreciated that technologies for maneuvering a payload 112 using a guided lift system 100 are provided herein. The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

What is claimed is:

1. A guided lift system for maneuvering a payload, comprising:
    a lift unit attached to the payload, wherein the lift unit comprises a lift vehicle that operates to lift the payload in a vertical direction and to create a non-vertical lift component in a horizontal direction;
    a first control tether attached to the lift unit;
    a first control unit adjustably coupled to the first control tether, the first control unit fixed to a first position and operative to adjust a length of the first control tether between the first control unit and the lift unit;
    a second control tether attached to the lift unit; and
    a second control unit adjustably coupled to the second control tether, the second control unit fixed to a second position and operative to adjust a length of the second control tether between the second control unit and the lift unit such that coordinated length adjustments of the first control tether and the second control tether via the first control unit and the second control unit controls movement of the lift unit and payload between the first position and the second position, and wherein the non-vertical lift component created by the lift vehicle can move the lift unit and the payload in the horizontal direction to a location that is not linearly aligned with the first position and the second position.

2. The guided lift system of claim 1, wherein the lift unit comprises a payload tether such that the lift unit is attached to the payload via the payload tether.

3. The guided lift system of claim 2, wherein the first control tether and the second control tether are attached to the lift vehicle.

4. The guided lift system of claim 2, wherein the first control tether and the second control tether are attached to the payload tether.

5. The guided lift system of claim 2, wherein the first control tether and the second control tether are attached to the payload.

6. The guided lift system of claim 2, wherein at least one of the first control tether and the second control tether electrically couples the lift vehicle to a power source.

7. The guided lift system of claim 1, wherein the first control unit and the second control unit each comprise a motorized winch assembly.

8. The guided lift system of claim 1, further comprising a controller communicatively coupled to the first control unit and the second control unit, the controller operative to coordinate length adjustments of the first control tether and the second control tether to move the lift unit and payload.

9. The guided lift system of claim 1, further comprising:
   a third control tether attached to the lift unit; and
   a third control unit adjustably coupled to the third control tether, the third control unit fixed to a third position and operative to adjust a length of the third control tether between the third control unit and the lift unit such that coordinated length adjustments of the first control tether, the second control tether, and the third control tether via the first control unit, the second control unit, and the third control unit controls movement of the lift unit and payload between the first position, the second position, and the third position.

10. The guided lift system of claim 1, wherein the vertical thrust magnitude of the lift vehicle is remotely controllable during operation.

11. The guided lift system of claim 1, wherein the vertical thrust magnitude of the lift vehicle is fixed while maneuvering the payload.

12. A guided lift system for maneuvering a payload, comprising:
   a lift unit attached to the payload, wherein the lift unit comprises a lift vehicle having a plurality of rotors;
   a first control tether attached to the lift unit;
   a first control unit adjustably coupled to the first control tether, the first control unit fixed to a first position and operative to adjust a length of the first control tether between the first control unit and the lift unit;
   a second control tether attached to the lift unit; and
   a second control unit adjustably coupled to the second control tether, the second control unit fixed to a second position and operative to adjust a length of the second control tether between the second control unit and the lift unit such that coordinated length adjustments of the first control tether and the second control tether via the first control unit and the second control unit controls movement of the lift unit and payload between the first position and the second position, wherein the lift vehicle having a non-vertical lift component such that an origination location of the payload is located on a line intersecting the first position and the second position, and a destination location of the payload is located at a position offset from the line intersecting the first position and the second position.

13. The guided lift system of claim 1, wherein at least one of the first position and the second position is attached to a vehicle.

14. The guided lift system of claim 1, wherein the first position comprises a mobile or fixed ground location, and wherein the second position comprises a rooftop location such that the second position is at a higher altitude than the first position.

15. A guided lift system for maneuvering a payload, comprising:
   a lift unit comprising a lift vehicle having a plurality of rotors and a vertical thrust magnitude that is variable, and a payload tether attached to the payload;
   a first control tether attached to the lift unit;
   a first motorized winch assembly coupled to the first control tether, the first motorized winch assembly fixed to a first position and operative to adjust a length of the first control tether between the first motorized winch assembly and the lift unit;
   a second control tether attached to the lift unit;
   a second motorized winch assembly adjustably coupled to the second control tether, the second motorized winch assembly fixed to a second position and operative to adjust a length of the second control tether between the second motorized winch assembly and the lift unit such that coordinated length adjustments of the first control tether and the second control tether via the first motorized winch assembly and the second motorized winch assembly controls movement of the lift unit and payload between the first position and the second position; and
   a controller communicatively coupled to the first motorized winch assembly and the second motorized winch assembly, the controller operative to coordinate length adjustments of the first control tether and the second control tether to move the lift unit and payload,
   wherein the first control tether and the second control tethers are the only control tethers coupled to the lift vehicle, and wherein the lift vehicle comprises a non-vertical lift component such that an origination location of the payload is located on a line intersecting the first position and the second position, and a destination location of the payload is located at a position offset from the line intersecting the first position and the second position.

16. The guided lift system of claim 15, further comprising:
   a remote control device operative to provide user-supplied control to the controller for moving the lift unit and payload between positions.

17. A method for maneuvering a payload, the method comprising:
   lifting a payload attached to a lift unit comprising a payload tether and a modular vehicle lift system with a plurality of lift vehicles connected to one another;
   at a first control unit at a first position, lengthening a first control tether attached to the lift unit;
   at a second control unit at a second position, shortening a second control tether at a rate corresponding to the lengthening of the first control tether to pull the lift unit toward a location between the first position and the second position; and
   at the plurality of lift vehicles, creating a non-vertical lift component to move the lift unit and the payload in a horizontal direction to a location that is not linearly aligned with the first position and the second position.

18. The method of claim 17, further comprising coordinating the lengthening of the first control tether and the shortening of the second control tether to lift, move, and lower the lift unit.

19. The method of claim 17, further comprising:
at a third control unit at a third position, adjusting a length of a third control tether at a rate corresponding to the lengthening of the first control tether and shortening of the second control tether to pull the lift unit to a destination location offset from a line intersecting the first position and the second position.

20. The method of claim 17, further comprising:
mounting the first control unit to a ground or a vehicle;
mounting the second control unit to a rooftop,
wherein pulling the lift unit to the destination location between the first position and the second position comprises pulling the lift unit from a first position on the ground to a destination location on the rooftop.

* * * * *